Jan. 16, 1968 D. K. SLOPER 3,364,472

COMPUTATION UNIT

Filed March 6, 1964 4 Sheets-Sheet 1

WITNESSES

Theodore F. Wrobel

James F. Young

INVENTOR

David K. Sloper

BY Dean Schron

ATTORNEY

Jan. 16, 1968 D. K. SLOPER 3,364,472

COMPUTATION UNIT

Filed March 6, 1964 4 Sheets-Sheet 3

United States Patent Office 3,364,472
Patented Jan. 16, 1968

3,364,472
COMPUTATION UNIT

David K. Sloper, Catonsville, Md., assignor to Westinghouse Electric Corporation, East Pittsburgh, Pa., a corporation of Pennsylvania Filed Mar. 6, 1964, Ser. No. 349,870
8 Claims. (Cl. 340—172.5)

This invention in general, relates to computation units, and more in particular to an arithmetic and/or logic unit particularly well adapted for use in parallel network type computer systems.

Many types of problems, both mathematical and logical, are best adapted to be solved by a parallel type of computation and to this end there have been proposed parallel type computer systems wherein a central control unit will simultaneously control a plurality of individual and similar computing, or processing elements. The processing elements are generally arranged in a matrix type of an array and possess the capabilities of communicating, that is, transfering information to other preselected processing elements of the array, such as its nearest neighbor processing element. The central control means decodes instructions and provides a plurality of control signals which are simultaneously fed to each processing element of the array such that each will carry out the operation as specified by the control signals. The specified operations are performed upon information stored within memory means associated with each of the individual processing elements. These processing elements are then capable of executing, simultaneously, all logical functions upon operands stored within themselves or a neighboring processing element, and if arithmetic means are provided within each processing element a great variety of problems may be solved by the computer thus provided. The central control means sends the identical control signals to all the processing elements of the array and at any given instant, every processing element in the system is performing the same operation on operands located at the same memory addresses in the memory means associated with each of the processing elements. Since these stored operands may represent numbers having different values, different logic or arithmetic results occur in the processing elements. One or more of the processing elements may be capable of completing a particular problem before other processing elements of the array, and yet the processing element or elements which have completed the problem must wait for the other processing elements to finish since every processing element is receiving identical control signals from the central control means. In other applications it would be desirable to have different processing elements of the array work on different portions of particular problems, and to greatly increase the speed in the solution of a problem it would be desirable to have these different processing elements operate on the different portions of particular problems, simultaneously.

It is therefore one object of the present invention to provide an improved computation unit for a computer system.

It is another object to provide arithmetic and/or logic means which will carry out a single operation in response to a command designating a plurality of operations.

It is still another object to provide an improved computation unit for use in a processing element of a parallel network computer having a plurality of processing elements, which unit will allow different processing elements to perform different operations simultaneously.

It is yet another object to provide a computation unit particularly well adapted for use in a processing element of a parallel network computer which will allow the computer to solve various problems at faster speeds than heretofore.

A further object is to provide a computation unit having the capabilities of performing arithmetic and logic operations and in addition, derive output signals as a function of input operand signals and the state of operations of various bistable devices.

Briefly, in accordance with the above objects, the broad concept of the invention comprises a computation unit which may operate to be selectively responsive to a plurality of control signals representing various operations to be performed, so that only one of the operations designated will be carried out by the unit. The objects and the basic concept are accomplished in the present invention, one illustrative embodiment of which comprises a logic network having a plurality of sections each for carrying out a specific operation in response to specific commands. Operation control means are provided and is responsive to predetermined input signals for providing a plurality of operation signals on output lead means with the pattern of operation signals provided representing specific operations to be performed. The logic network is operatively connected to the operation control means to be thereby responsive to the operation signals provided. The computation unit is particularly well adapted for use in a processing element of a parallel network computer having a plurality of processing elements all under control of a central control means and receiving identical control signals therefrom. The operation control means in each of the processing elements may be made responsive to one of several conditions such as an instruction from the central control means, or a condition within its associated processing element, in order to provide a specific pattern of operation signals to its associated logic network. In this manner, the operation control means in different processing elements may provide different operation signals thereby allowing different processing elements to perform different operations. During operation in this manner, the central control means provides a plurality of control signals representing various operations. An individual processing element will respond only to those control signals designating the operation as represented by the operation signals provided by the operation control means in the processing element.

The above stated and further objects of the present invention will become apparent upon a reading of the following detailed specification taken in conjunction with the drawings in which.

Figures 3A, 3B, 3C, 3D, 4:
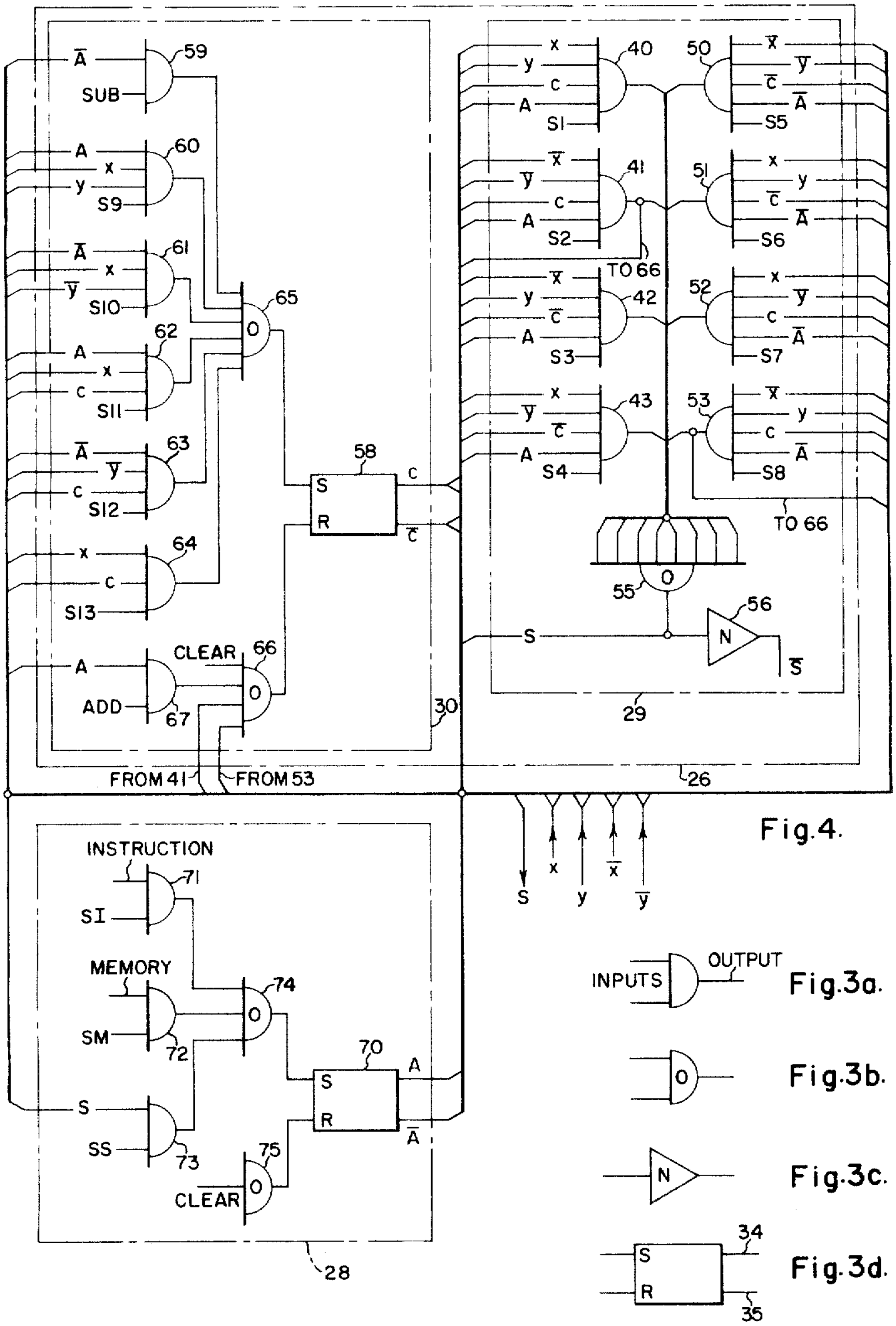
Figure 5:
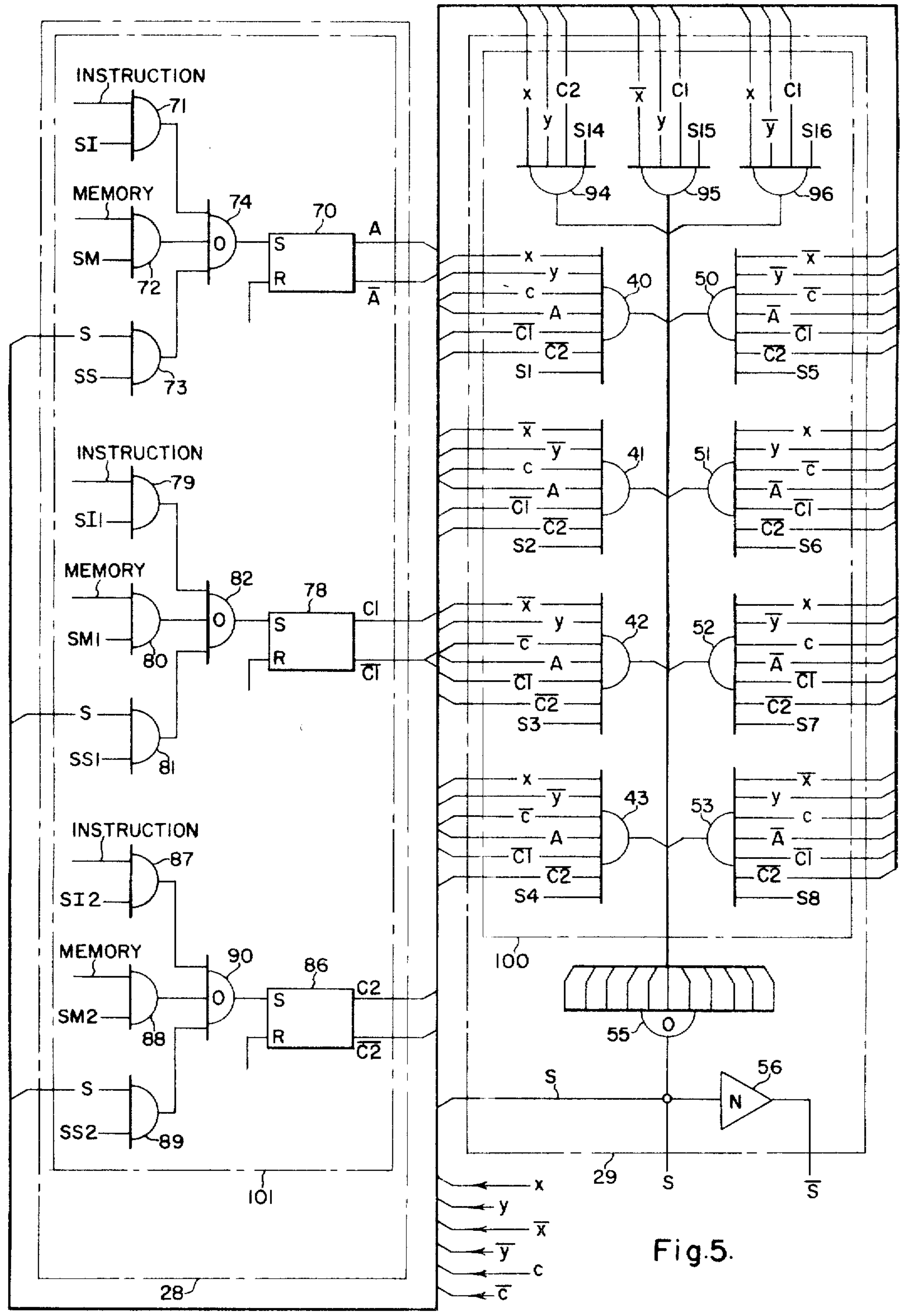
Figure 6:
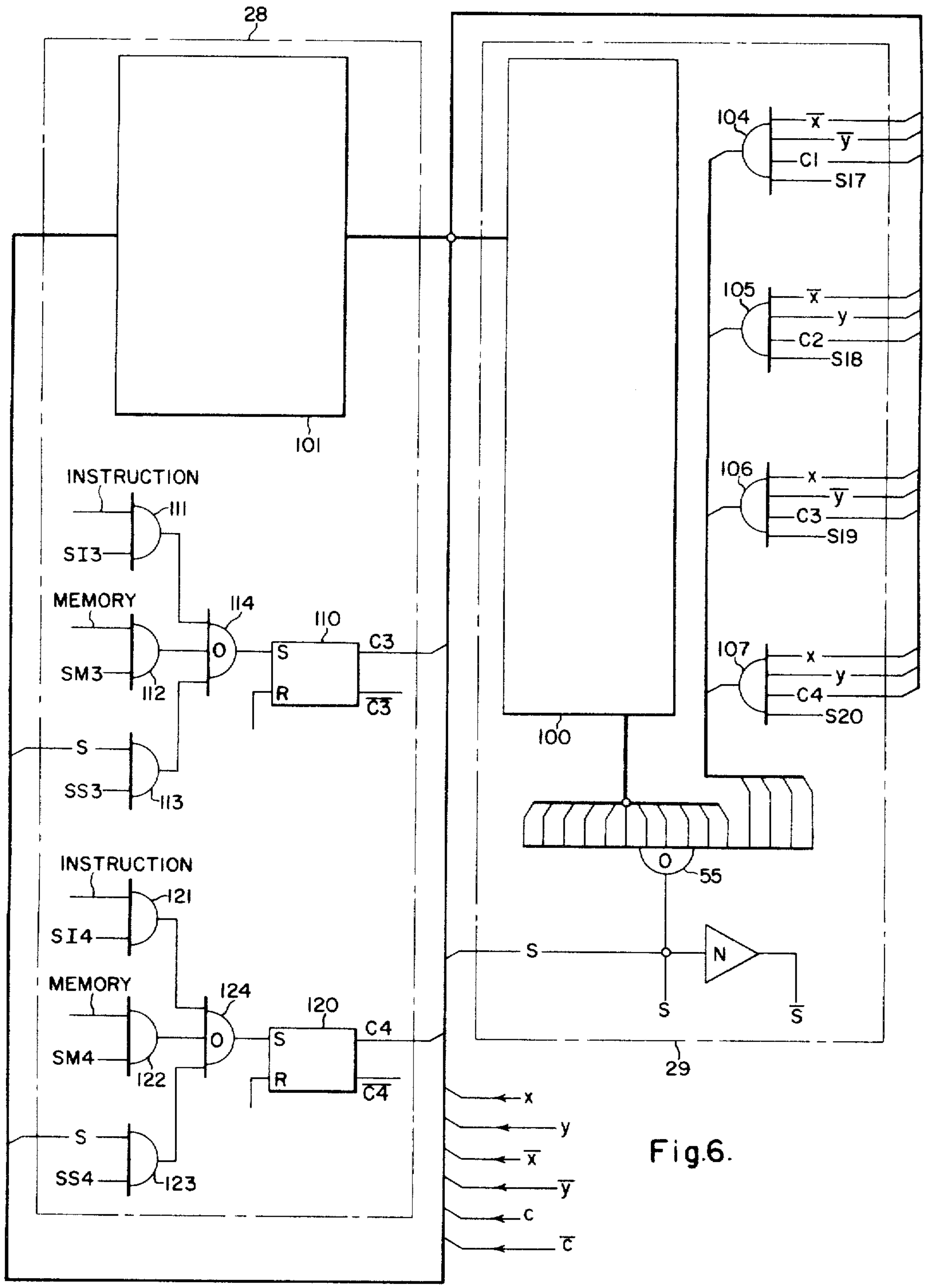

FIGURES 3*a*, 3*b*, 3*c* and 3*d* illustrate logic symbols which will be utilized herein;

FIGURE 4 illustrates one embodiment of the present invention in more detail;

FIGURE 5 illustrates another embodiment of the present invention in more detail; and FIGURE 6 illustrates still another embodiment of the present invention in more detail.

Figure 1:
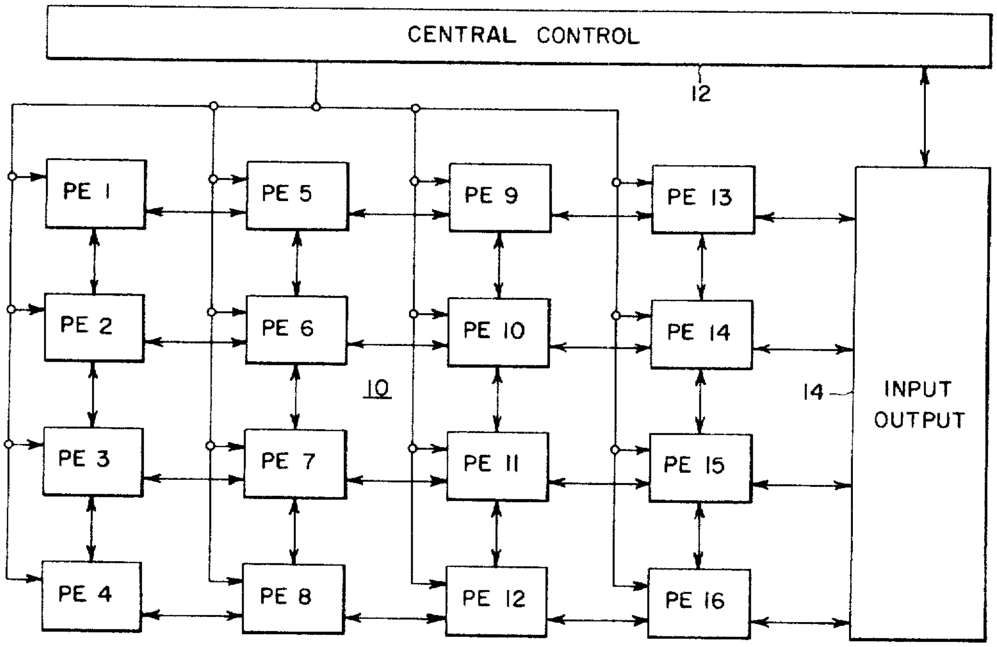
FIGURE 1 illustrates in block diagram form a parallel network computer.

Referring now to FIGURE 1, there is shown a typical parallel network computer, the present invention being particularly well adapted for use in such a system. An array of processing elements, 10 is shown with the processing elements labeled PE 1 to PE 16, although more or fewer processing elements may be utilized in other predetermined arrays. Each of the processing elements shown is under control of the central control means 12 and each receives identical control signals therefrom for carrying out operations as specified by the control signals. Input-output means 14 is generally provided for loading and extracting information into and from the system. A typical processing element may include memory means for storing information in the form of operands, routing means for transferring information to and from neighboring processing elements, and means under the control of the central control means 12 for performing specified operations on the operands stored in the memory means. One type of parallel network computer and a typical processing element therefor is more fully shown and described in a copending application by Daniel Slotnik, Ser. No. 242,234, filed Dec. 4, 1962 and assigned to the assignee of the present invention. The subject invention finds use with such a system described, and to this end reference is now made to FIGURE 2.

Figure 2:
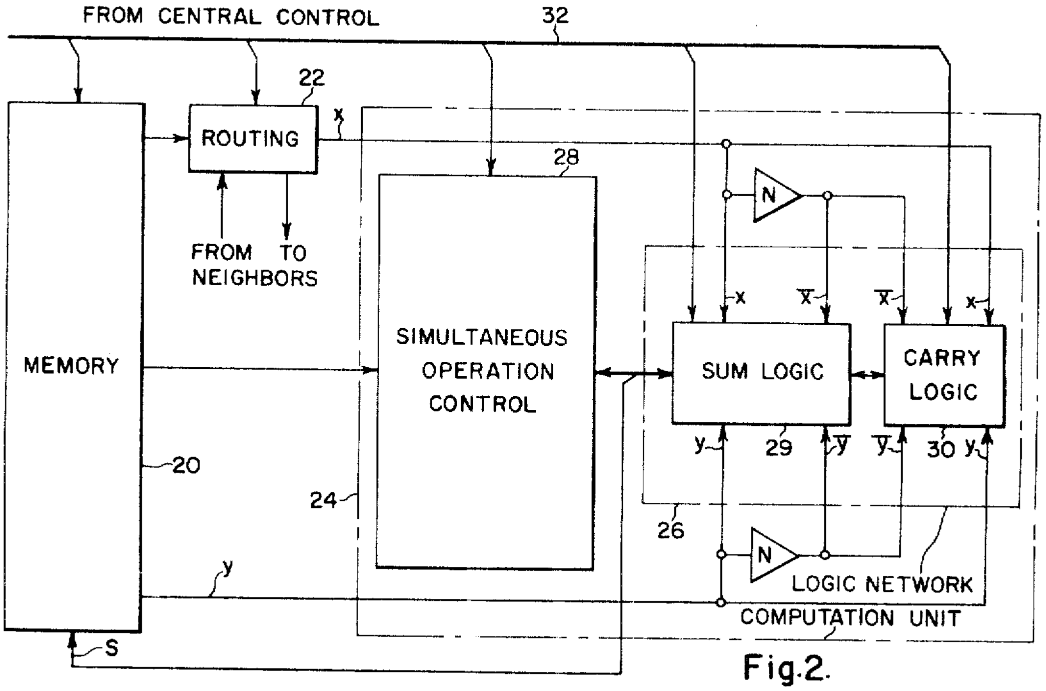
FIGURE 2 is an embodiment of the present invention utilized in an illustrative environment.

In FIGURE 2 there is shown a processing element which may be used in a system such as shown in FIGURE 1, and incorporating the present invention. The processing element includes a memory means 20 for providing a first and second operand signal designated as $x$ and $y$. Routing means 22 is provided in order to transfer information to and from neighboring processing elements. The present invention shown as the computation unit 24 includes a simultaneous operation control 28 operating in conjunction with a logic network 26. One illustrative embodiment of a logic network which will be described herein includes means for performing both arithmetic and logic operations. The network 26 includes a plurality of sections for performing these various operations, the sections being located in the sum logic means 29 and the carry logic means 30 to be more fully described hereinafter. It is seen that the logic network 26 receives operand signals indicative of a first and second operand, which signals are designated $x$ and its complement $\overline{x}$, and $y$ and its complement $\overline{y}$. As illustrated in FIGURE 2, each of the components of the processing elements shown, receives control signals from the central control means by means of a bus 32. Before explaining the details of the computation unit 24, reference should be made to FIGURES 3*a*, 3*b*, 3*c* and 3*d* which show several types of logic elements which may be utilized herein although it is obvious that the invention is not limited thereto.

FIGURE 3*a* shows a logic symbol designating an AND gate which will provide an output signal only if all of the input signals are present. In binary terms, a 1 signal on one input lead will enable the AND gate and a 0 signal will render the gate inoperative to pass input signals. If an AND gate is enabled, and the remaining input signals received are 1's the AND gate will provide a 1 output signal;

FIGURE 3*b* shows the logic symbol for an OR gate which will provide an output signal if at least one input signal is present;

FIGURE 3*c* shows a logic symbol designating a NOT gate or inverter, the output signal of which is the complement of its input signal;

FIGURE 3*d* symbolically illustrates a flip-flop. The flip-flop is a bistable device capable of assuming two stable states of operation generally termed a set and reset state. In the present example a 1 signal on the set input labeled S will provide a 1 signal from the upper output lead 34 whereas a 1 signal on the reset input labeled R will provide a 1 signal on the lower output lead 35.

FIGURE 4 shows in more detail the computation unit 24 of FIGURE 2. In the illustrative embodiment of the invention, the logic network 26 (FIGURE 2) includes, as shown in more detail in FIGURE 4, sum logic means 29 and carry logic means 30. The sum logic means includes two sections each including a plurality of AND gates with a first section having gates 40 to 43 and a second section having gates 50 to 53. Each of the gates 40 to 43 and 50 to 53 has a plurality of input lead means and an output means which forms one input to the OR gate 55, the output of which is designated as S and constitutes the output signal representative of the result of an operation performed by the logic network. NOT gate 56 may be provided in order to obtain the complement, $\overline{S}$, should it be desired.

The carry logic means 30 includes a carry flip-flop designated as the $c$ flip-flop 58 which may be placed into a set condition by a 1 signal on its set input as a result of various combinations of signals appearing on gates 59 to 64 as will hereinafter be explained; the $c$ flip-flop 58 may also be placed into a reset condition by a 1 signal on its reset input emanating from gate 66. The output signals of the carry flip-flop 58 are designated as $c$ and $\overline{c}$.

In order to control various sections of the logic network so that they may carry out specific commands, the operation control means 28 includes means for providing a plurality of output operation signals which will enable specific sections of the logic means. For a first illustrative embodiment of the present invention the operation control means 28 includes a bistable device in the form of the A flip-flop 70 having two output leads designated A and $\overline{A}$, and input means for placing the A flip-flop into one of its set or reset conditions. Basically, the input means is responsive to at least one, and preferably to one of several conditions present in the computer system. By way of example, input means for setting the A flip-flop 70 includes a plurality of gates 71 to 74. AND gate 71 includes an input for receiving a signal designated SI, which will enable it, AND gate 72 has an input for receiving an SM enabling signal and AND gate 73 has an input for receiving an SS enabling signal; the enabling signals SI, SM, and SS in the present example emanate from the central control means as a result of a predetermined computer instruction. In addition to the aforementioned enabling signals, AND gate 71 includes an input for receiving an input signal indicative of a bit in an instruction, AND gate 72 may receive on its second input a signal indicative of a bit in its associated memory which would emanate from the memory means 20 (FIGURE 2), and AND gate 73 may receive as its second input signal the output signal from the logic network, and designated as S. The input means for placing the A flip-flop 70 into a reset condition may include an OR gate 75 for receiving a clear signal, for example, from central control means 12. The first section of the logic network comprising AND gates 40 to 43 are operable, in conjunction with the carry means 30, to perform an addition operation, while the second section comprising AND gates 50 to 53 is operable in conjunction with carry means 30, to implement a subtraction operation. Each of the AND gates 40 to 43 may have an input for receiving, respectively, signals S1 to S4, which signals may emanate from the central control means to designate an addition operation. AND gates 50 to 53 receive, respectively, signals S5 to S8 which may be representative of a subtraction operation. Each of the AND gates 40 to 43 and 50 to 53 have additionally applied thereto combinations of operand signals indicative of a first and second operand, and output signals from the carry logic means 30. By way of example, AND gate 40 is operable to receive signal $x$ indicative of a first operand, $y$ indicative of a second operand, $c$ which is the upper output lead from the carry flip-flop 58, and A from the upper output lead of the A flip-flop 70 of the operation control means 28. AND gate 50 is operable to receive the complements of these latter named signals, that is gate 50 receives the $\overline{x}$, the $\overline{y}$, $\overline{c}$ and the $\overline{A}$ signals. Gate 41 receives the $\overline{x}$, $\overline{y}$, $c$ and A signal, and gate 51 receives the complements in the form of the $x$, $y$, $\overline{c}$, and $\overline{A}$ signals. In a similar fashion gate 42 receives the $\overline{x}$, $y$, $\overline{c}$, and A signals whereas gate 52 receives the $x$, $\overline{y}$, $c$ and $\overline{A}$ signals. The last gate 43 of the first plurality of gates receives the $x$, $\overline{y}$, $\overline{c}$ and A signals whereas the last gate 53 of the second plurality receives the $\overline{x}$, $y$, $c$ and $\overline{A}$ signals.

The outputs of AND gates 41 and 53 are connected to OR gate 66 in order to reset the $c$ flip-flop 58 if certain conditions exist, during an addition operation or subtraction operation respectively. Referring to the carry logic means 30, the OR gate 66 may receive a 1 signal from any desired source such as a central control means in order to provide a 1 signal to reset the carry flip-flop 58 such that a 1 appears on the $\bar{c}$ lower lead.

At the start of an addition operation to be subsequently explained, the $c$ flip-flop must be reset. AND gate 67 is provided to perform this resetting function in response to an AND signal from the central control means, and an A signal from the A flip-flop 70. OR gate 65 is operable to receive any output signals from a plurality of AND gates such as 59 to 64, in order to provide a 1 output signal on the $c$ upper lead, if certain predetermined conditions are met.

AND gate 59 is operable to receive the $\bar{A}$ signal from the A flip-flop 70 in addition to a SUB signal from the central control means, in order to set the $c$ flip-flop 58 at the start of a subtraction operation. AND gate 60 receives the A signal appearing on the upper output lead A of the A flip-flop 70, the $x$ and $y$ signals indicative of first and second operands and a control signal S9 which may emanate from the central control means. AND gate 61 receives the $\bar{A}$ signal from the $\bar{A}$ lower lead of the A flip-flop 70, the $x$ operand signal, the $\bar{y}$ operand signal and a control signal designated as S10. AND gate 62 receives the A signal from the A flip-flop 70, the $x$ signal indicative of the first operand, the $c$ output signal from the $c$ flip-flop 58 and a control signal designated as S11. AND gate 63 receives the $\bar{A}$ signal from the A flip-flop 70 the $\bar{y}$ operand signal, the $c$ signal from the $c$ flip-flop 58 in addition to a control signal designated S12. AND gate 64 receives the $x$ operand signal, the $c$ output signal from the $c$ flip-flop 58 and a control signal designated as S13.

OR gate 75 of the operation control means 28 receives a clear signal which may, for example, emanate from the central control means, in order that a 1 signal may be applied to the reset side of the A flip-flop 70 such that a 1 signal will appear on the $\bar{A}$ output lead and a 0 signal will appear on the A output lead. Conversely, a 1 signal will appear on the A output lead and a 0 signal will appear on the $\bar{A}$ output lead upon the application of a 1 signal to the set side of the A flip-flop 70. This 1 signal will be provided by OR gate 74 upon the receipt of a 1 signal from AND gate 71 or AND gate 72 or AND gate 73 each of which will provide the 1 signal if its respective first and second input signals are both 1's. In order to illustrate the operation of the embodiment of the invention thus far described, a situation will be considered wherein it is desired to have half the processing elements of the array 10 (FIGURE 1) perform an addition operation while the other half performs a subtraction operation. The operands upon which the respective operations are to be performed, may be located in neighboring processing elements or a processing element's own associated memory. Initially, a 1 bit may be loaded into a specific memory location in the processing elements which are to perform the addition operation, and a 0 bit may be stored at a corresponding location in the memory means of the processing elements to perform a subtraction operation. In response to the decoding of an instruction, the central control means will provide an enabling SM signal to the AND gate 72 of the operation control means 28 in each of the processing elements of the array. A command may then designate that the prestored bit in the memory portion of each processing element be applied to the second input of AND gate 72, and it may be seen that since the processing elements to perform an addition had a 1 previously stored, their respective AND gate 72 will provide a 1 output signal to OR gate 74 which then produces a 1 signal to place the A flip-flop 70 into a set state of operation such that a 1 signal appears on the A output lead and a 0 output signal appears on the $\bar{A}$ lead. In the processing elements which had a 0 prestored, the AND gate 72 will not provide a 1 output signal, the A flip-flop 70 will remain in a reset condition, and a 1 output signal will appear on the A lead and a 0 signal will appear on the A lead.

Since all of the processing elements are under control of the central control means and receive identical control signals therefrom, AND gates 40 to 43 and 50 to 53 of each processing elements will receive its respective control signal S1 to S8. In those processing elements which are to perform an addition, the 1 signal on lead A from the A flip-flop 70 is applied to each of the gates 40 to 43 and thereby enable them whereas the 0 signal on lead $\bar{A}$ is applied to gates 50 to 53 which therefore remain inoperative. Conversely, in those processing elements in which a 1 signal appears on the $\bar{A}$ lead of the A flip-flop 70, AND gates 50 to 53 will be enabled thereby whereas gates 40 to 43 will be inoperative since each receives a 0 input signal on the A lead of the A flip-flop 70. By examining the carry logic means 30, it is seen that for an addition operation AND gates 60, 62 and 67 will be enabled by the 1 signal on the A lead of the A flip-flop 70, and for a subtraction operation AND gates 59, 61 and 63 will be enabled by the 1 signal on the $\bar{A}$ lead. Whereas the plurality of gates 29 have been designated as the sum logic means it is apparent that it also may function as a difference logic means and whereas the logic designated 30 has been termed carry logic means it is to be understood that the term borrow means is applicable, for the performance of the subtraction operation. By selectively enabling various gates of the sum logic means 29 with various S1 to S8 signals, other types of logic operations may be performed.

As was stated, information in the form of operands are stored in the memory means 20 (FIGURE 2). Information upon which operations are to be performed are herein termed operands with each operand comprising a plurality of bits with each bit or its complement being termed herein an operand signal. Of course, in memory systems having only one bit operands, the term operand and operand signal then becomes synonymous. In the embodiment of the invention illustrated, operations are performed in a serial fashion bit-by-bit such that the first bits, second bits, . . . $i^{th}$ bits of both operands are examined simultaneously. In the example, if an operand signal is present it has the value of 1, and its complement has the value of 0, whereas if an operand signal is not present it has a value of 0 and its complement has a value of 1, as is well known to those skilled in the art.

By way of demonstration, an addition operation will be set forth to demonstrate the sequence of steps that occur in one of the processing elements wherein the A flip-flop 70 is in a set condition. By way of example the $x$ operand will be the number 13 which in familiar binary form is 01101, and the y operand will be the number 4 which in binary form is 00100. Since the computation unit operates in a serial-by-bit fashion the $x$ operand signal for the first bit time will be 1 (the right-most bit) and the $y$ operand signal will be 0. At each bit time the operands will be examined and an addition will be performed in accordance with the well known expression for sum which is:

$$S=\bar{x}\bar{y}c+\bar{x}y\bar{c}+x\bar{y}\bar{c}+xyc$$

$$c'=\bar{x}yc+x\bar{y}c+xy\bar{c}+xyc$$

($S$=sum, $c$=old carry, $c'$=new carry)

At the start of the addition operation the ADD signal is applied to the enabled AND gate 67 in order to reset the $c$ flip-flop 58. Thereafter the operand signal $x$, which is a 1, the operand signal $y$, which is a 0, and the $c$ signal which is a 0 are applied to all of the gates so labeled. Since the $\bar{A}$ signal is a 0 none of the gates 50 to 53 will be operative to provide an output signal. It may be seen that since all of its inputs are 1's AND gate 43 will be the only one to provide a 1 output signal to OR gate 55. The S signal emanating from OR gate 55 therefore will be a 1 and will constitute the first and right-most bit of the solution. By examining the carry logic means 30 and the two enabled AND gates 60 and 62 it may be seen that neither will provide a 1 output signal to cause a setting of the $c$ flip-flop 58, which remains reset and the $c$ signal remains a 0 for the next bit operation in which $x$ is a 0 and $y$ a 0 (the second right-most bits of the $x$ and $y$ operands). At this second bit time there is no AND gate which will provide a 1 output in response to the combination of operand signals received, so that OR gate 55 provides a 0 output signal at the second bit time and constitutes the second and second right-most bit of the solution. No combination of input signals to AND gate 60 or 62 of the carry logic means is present to cause setting of the $c$ flip-flop 58 and the carry signal remains 0 for the next bit time in which the $x$ operand signal is a 1 and the $y$ operand signal is a 1, which combination of signals is inoperative to cause any of the AND gates 40 to 43 to provide a 1 signal to the OR gate 55; thus the output signal for the third bit is a 0. By examining AND gates 60 and 62 once more it may be seen that AND gate 60 receives a 1 signal from the A side of the A flip-flop 70, a 1 signal indicative of the $x$ operand and a 1 signal indicative of the $y$ operand, thereby providing a 1 output signal to OR gate 65 which causes the setting of the $c$ flip-flop 58 such that the $c$ signal is a 1 for the next bit operation in which $x$ is a 1 and $y$ is a 0. Again it may be seen that this combination of signals will provide a 0 output signal from OR gate 55 constituting the fourth bit of the solution. The carry signal remains a 1 for the next bit operation, in which $x$ and $y$ are 0's, which combination of signals applied to AND gate 41 causes a 1 output signal to be simultaneously applied to the OR gate 55 thus providing a 1 output signal, and to OR gate 66 of the carry logic 30 to cause resetting of the $c$ flip-flop 58. It may be thus seen that the sum of the addition of 01101 (13) and 00100 (4) provides a result of 10001 (17).

In the processing elements having the A flip-flop 70 in a reset condition a subtraction operation takes place on a correspondingly located $x$ and $y$ operand and a subtraction will be performed in accordance with the expression:

$$S\ (\text{difference})=\bar{x}\bar{y}\bar{c}+xy\bar{c}+x\bar{y}c+\bar{x}yc$$

$$C\ (\text{borrow})=xc+x\bar{y}+\bar{y}c$$

Whereas in addition the S and $c$ represented a sum and carry, in the above equations for subtraction, the S and $c$ represent a difference and borrow, respectively. By way of example, a subtraction operation will be performed wherein the $x$ operand is 14, 01110 in binary form, and the $y$ operand is 5, 00101 in binary form. The sum and carry logic 29 and 30 is arranged to perform a 2's complement subtraction and therefore the $c$ flip-flop 58 must be placed into a set condition such that when the first $x$ and $y$ operand signals are examined, the $c$ signal will be a 1. At the start of the operation the $\bar{A}$ signal to AND gate 59 enables it such that when a SUB signal is received on the other input thereof from the central control means, an output signal will be provided to place the $c$ flip-flop 58 into its set condition. It might be again noted that in the processing elements concurrently performing an addition operation, the A signal enables AND gate 67 such that when the ADD signal is received from the central control means, an output signal will be provided to reset the $c$ flip-flop 58 as was previously demonstrated. At the first bit time the $x$ operand signal is a 0, the $y$ operand signal is a 1 and the $c$ operand signal is a 1 thereby causing AND gate 53 to provide a 1 output signal to OR gate 55, which the S signal emanating from OR gate 55 constituting the first, and right-most bit, of the solution. The output signal from AND gate 53 fed to OR gate 66 of the carry logic 30 also causes the $c$ flip-flop 58 to switch to its reset condition. At the second bit time the $x$ operand signal is a 1, the $y$ operand signal is a 0, and since the $c$ flip-flop 58 is in a reset condition, the $c$ signal is a 0. At this second bit time there is no AND gate which will provide a 1 output in response to the combination of operand signals received, so that OR gate 55 provides a 0 output signal which constitutes the second and second right-most bit of the solution. By examining the enabled AND gates 61, 63 and 64 it is seen that the previous combination of signals, that is, $x=1$, $y=0$, $c=0$ appearing as inputs to AND gate 61 causes it to provide an output signal which again places the $c$ flip-flop 58 into a set state of operation such that the $c$ signal for the next bit time will be a 1. At the next bit time all of the operand signals are 1's thereby producing a 0 output signal from OR gate 55 and causing the $c$ flip-flop 58 to remain in a set state of operation. The next combination of operand signals produces a 1 output signal, and the fifth combination produces a 0 output signal. The solution therefore being 01001, or 9; the result of subtracting 5 from 14.

The example just demonstrated was one wherein half of the processing elements had a 1 bit stored in a predetermined location in its associated memory means, and the other half of the processing elements had a 0 bit stored in a corresponding memory location such that the simultaneous operation control means 28 of each processing element containing the 1 bit provided operation signals corresponding to an addition operation and a simultaneous operation control means 28 of the other half of the processing elements provided operation signals indicative of a subtraction operation. In many instances it may be desired to have processing elements perform an addition or a subtraction operation in accordance with a predetermined result of the comparison of two operand signals. By way of example numbers stored in the memory portions of computers generally have one bit specifically designating whether or not the number is positive or negative; for example a 0 might represent a positive number and a 1 might represent a negative number. In the present example a problem might be to have a processing element perform an addition operation if the signs of two numbers are the same, and to perform a subtraction operation if they are different. Initially the central control means may provide a 1 signal to OR gate 66 to reset the $c$ flip-flop 58 and to OR gate 75 of the operation control means 28 in order to place the A flip-flop 70 into a reset state of operation. The $x$ and $y$ operand signals representing the signs of the $x$ and $y$ operands respectively may now be examined and it is seen that AND gates 40 to 43 will be inoperative due to the presence of at least a 0 input signal (A), and for this particular comparison operation an instruction may cause control signals S5 and S6 to be applied to AND gates 50 and 51 respectively; AND gates 52 and 53 will be inoperative due to the presence of at least a 0 input signal (S7 and S8). If the $x$ and $y$ operands signals are both 1's AND gate 51 will provide a 1 output signal causing the S output signal from OR gate 55 to be a 1, and if the $x$ and $y$ operand signals are both 0's AND gate 50 will provide a 1 output signal due to the presence of all 1 input signals (since the complements of the $x$ and $y$ signals will be 1's) thereby causing OR gate 55 to produce a 1 output signal. If the $x$ and $y$ operand signals are different, neither AND gate 50 nor 51 will provide an output signal and the S signal from OR gate 55 will remain a 0. During the testing of the operand signals, the SS enabling signal to AND gate 73 of the operation control means 28 is provided, and if the result of the test causes the output from OR gate 55 to be a 1, indicating identical $x$ and $y$ operand signals, AND gate 73 will therefore receive 1 signals on both of its inputs to cause OR gates 74 to provide a signal to place the A flip-flop 70 into a set condition indicating an addition operation. When the $x$ and $y$ operand signals are dissimilar the output signal provided by OR gate 55 is a 0 and consequently AND gate 73 will not provide a 1 output signal; the A flip-flop 70 will remain in a reset state of operation thereby indicating a subtraction operation. Thus it is seen that an individual processing element may be operable to perform a subtraction or addition operation in accordance with the result of a previous operation. If the processing elements are to perform only addition or subtraction operations the control signals S1 through S8 appearing on AND gates 40 to 43 and 50 to 53 respectively, may be eliminated since the operation signals provided by the operation selection means 28 will enable only one section of AND gates for performing either an addition or a subtraction operation. Greater flexibility of operation is obtained however when each of the AND gates 40 to 43 and 50 to 53 are individually or collectively controlled by control signals from the central control means.

In summary therefore the illustrative embodiment of the invention shown in FIGURE 4 includes a first section of a logic network capable of performing an addition operation and including AND gates 40 to 43, and a second section capable of performing subtraction operations, and including AND gates 50 to 53. An operation control means is operable to provide a pattern of operation signals to enable one of the first or second above-mentioned sections to carry out its specific operation. The operation control means includes input means for providing a predetermined pattern of operation signals in response to a predetermined condition within the computer system illustrated, information in the memory, or the result of an operation. A brief summary of the embodiment of FIGURE 4 may be seen in Table I.

TABLE I

| Operation Desired | Condition of flip flop | Pattern of Operation signals | |
|---|---|---|---|
| | | 1's | 0's |
| Addition | A (70) Set | A | $\overline{A}$ |
| Subtraction | A (70) Reset | $\overline{A}$ | A |

The first column is indicative of the type of operation desired, the second column sets forth the condition of the flip-flop of the operation means 28 for the desired operation, and the third column indicates the pattern of operation signals provided by the operation control means, which pattern is indicative of a certain operation. For example, if an addition operation is to be performed the A flip-flop 70 is in a set state of operation; the A signal is a 1 and therefore the $\overline{A}$ signal is a 0. For a subtraction operation the A flip-flop 70 is in a reset state of operation; the $\overline{A}$ signal is a 1 and the A signal is a 0. In the solution of a great many problems, it is often necessary to perform logic operations such as AND, OR, and the like, and to this end reference now should be made to FIGURE 5 which shows another embodiment of the present invention.

For ease of understanding, like elements in FIGURE 5 have been assigned the same numeral character as in FIGURE 4 with the understanding that the gates 40 to 43 and 50 to 53 each receives two additional signals as will be explained. The embodiment of FIGURE 5 similarly includes a plurality of sections for performing various operations. A first section including gates 40 to 43 will perform the addition operation and gates 50 to 53 will perform the subtraction operation as was demonstrated with respect to FIGURE 4. For purposes of clarity the carry logic means 30 has been omitted; it may however, be identical to that shown in FIGURE 4. A section of the logic network 26 comprising the single AND gate 94 is operable to perform and AND operation, the three AND gates 94, 95 and 96 collectively are operable to perform an OR operation and AND gates 95 and 96 are operable to perform an exclusive OR operation as will be demonstrated.

The operation control means 28 includes the A flip-flop 70 as was the case with respect to FIGURE 4, in addition to two additional flip-flops the C1 flip-flop 78 and the C2 flip-flop 86. The signal appearing on the upper output lead of the C1 flip-flop 78 will be termed the C1 signal while the signal on the lower output lead will be the $\overline{C1}$ signal. Similarly, the signal appearing on the upper output lead of the C2 flip-flop 86 will be termed the C2 signal and the output signal on the lower output lead thereof will be termed the $\overline{C2}$ signal; with the pattern of output signals provided by the flip-flops representing various operations to be performed. The C1 flip-flop 78 has input means including a plurality of gates 79, 80, 81 and 82 for placing it into a set condition with each of the gates 79, 80, and 81 receiving a unique enabling signal SI1, SM1, and SS1 respectively. The second input to each of the gates 79, 80 and 81 may receive a signal indicative of a predetermined condition within the system as was explained with respect to the A flip-flop 70. The conditions by way of example, similarly may be a predetermined instruction, a particular bit in the memory means, or the result of a previous operation. The input means for placing the C2 flip-flop 86 into a set condition includes a plurality of gates 87, 88, 89 and 90 with the gates 87, 88 and 89 receiving a unique enabling signal SI2, SM2, SS2 respectively. The second input to each of the gates 87, 88 and 89 is operable to receive a signal indicative of a predetermined condition such as an instruction, a bit in memory, or the result of a previous operation. Each of the flip-flops 70, 78, and 86, has an input lead to the reset side which may receive a reset signal from, for example, a central control means. Each of the AND gates 40 to 43 as well as the AND gates 50 to 53 is operable to receive the identical combination of operand signals, carry, and control signals as was demonstrated with respect to FIGURE 4, in addition to receiving the $\overline{C1}$ and $\overline{C2}$ signals from the C1 and C2 flip-flops 78 and 86. When either one or both of these flip-flops are placed into a set condition the $\overline{C1}$ or $\overline{C2}$ or both signals will be 0 and, the gates 40 to 43 and 50 to 53 will be inoperable to provide any output signals to OR gate 55 (regardless of the condition of the A flip-flop 70). An AND function may be performed on an $x$ and $y$ operand signal bit by causing the C2 flip-flop 86 to be placed in a set condition and the C1 flip-flop 78 to be placed in a reset condition and by supplying at least control signal S14. Gates 40 to 43 and 50 to 53 each receive a 0 $\overline{C2}$ signal and will be inoperative. Since the C1 flip-flop 78 is reset, the C1 signal to AND gates 95 and 96 will be 0 and consequently AND gate 94 will be the only gate that is enabled. If both $x$ and $y$ are 1's a 1 output signal will be provided by the AND gate 94 to cause OR gate 55 to produce a 1 output signal. An OR function may be performed by setting both the C1 and C2 flip-flops 78 and 76 and by supplying control signals S14, S15 and S16 to AND gates 94, 95 and 96 respectively. If the $x$ operand signal and the $y$ operand signal are 1's AND gate 94 will produce a 1 output signal; if the $x$ operand is a 0 (and consequently the $\overline{x}$ is a 1) and $y$ operand is 1, AND gate 95 will produce a 1 output signal; and if the $x$ operand is a 1 and the $y$ operand is a 0 (and consequently the $y$ signal is a 1) AND gate 96 will provide a 1 output signal, thus implementing an OR function wherein an output signal will be provided if either one or both of two input signals is a 1. An exclusive OR function may be implemented whereby an output signal will be provided if one or the other, but not both, of two input signals is a 1. This is accomplished by causing the C1 flip-flop 78 to be placed into a set condition and the C2 flip-flop 86 to be placed into a reset condition such that the C1 signal to AND gates 95 and 96 will enable these gates and a 0 C2 signal will be provided to AND gate 94 such that out of all the gates shown in the sum logic means 29, only AND gates 95 and 96 will be enabled to provide an output signal if either the $x$ operand or the $y$ operand is a 0. As was the case with respect to the embodiment shown in FIGURE 4, the various control signals applied to the gates of the sum of logic means 29 of FIGURE 5 may be eliminated and operations performed by the sum network 29 may be governed entirely by the pattern of operation signals provided by the operation control means 28. The different possible operations, the condition of the flip-flops and the pattern of operation signals provided is summarized in Table II.

TABLE II

| Operation Desired | Condition of flip flop | Pattern of Operation signals | |
|---|---|---|---|
| | | 1's | 0's |
| Addition | A (70) Set<br>C1 (78) Reset<br>C2 (86) Reset | A<br>$\overline{C1}$<br>$\overline{C2}$ | $\overline{A}$<br>C1<br>C2 |
| Subtraction | A (70) Reset<br>C1 (78) Reset<br>C2 (86) Reset | $\overline{A}$<br>$\overline{C1}$<br>$\overline{C2}$ | A<br>C1<br>C2 |
| AND | A (90) Either<br>C1 (78) Reset<br>C2 (86) Set | C1<br>C2 | $\overline{C1}$<br>$\overline{C2}$ |
| OR | A (70) Either<br>C1 (78) Set<br>C2 (86) Set | $\overline{C1}$<br>C2 | $\overline{C1}$<br>C2 |
| Exclusive OR | A (70) Either<br>C1 (78) Set<br>C2 (86) Reset | $\overline{C1}$<br>$\overline{C2}$ | $\overline{C1}$<br>C2 |

It is seen that for an addition or subtraction operation the C1 and C2 flip-flops 78 and 86 are placed into a reset condition. For an AND, OR, and exclusive OR function the A flip-flop 70 may be in either one of a set or reset state of operation since for these operations each of the AND gates 40 to 43 and 50 to 53 will be receiving a 0 input signal. With the provision of the present invention thus far described in the processing elements of a parallel network type computer greater flexibility and increased speeds may be obtained by having various ones of the processing elements performing addition operations, while others perform subtraction operations, while still others perform various logic operations such as AND, OR and exclusive OR. The factor which determines what operation will be performed in each of the processing elements is governed by the pattern and operation signals provided by the operation control means 28 which in turn is responsive to enabling control signals and the signals indicative of various predetermined conditions as was previously explained. Table II shows that five different operations may be performed simultaneously by the array of processing elements. For the performance of additional operations reference should now be made to FIGURE 6 which shows another embodiment of the present invention in which the various patterns of operation signals provided will govern the logic network output signals in accordance with different input operand signals.

The boxes numerically labeled 100 and 101 contain circuitry identical to that shown in the respective numbered boxes of FIGURE 5. The embodiment of FIGURE 6 includes other AND gates 104, 105 and 106 and 107 receiving control signals S17, S18, S19 and S20 respectively. The AND gates are also operable to receive various combinations of signals representative of a first and second operand in addition to being responsive to the operation selection means 28 which additionally includes a C3 flip-flop 110 and a C4 flip-flop 120. The C3 flip-flop 110 includes input means having a plurality of gates 111, 112, 113 and 114 with gate 111, 112 and 113 receiving a unique enabling signal SI3, SM3 and SS3 respectively, in order to place the C3 flip-flop 110 into a set state of operation in accordance with a predetermined condition. The C4 flip-flop 120 similarly includes input means having gates 121, 122, 123 and 124 with gates 121, 122, 123 receiving enabling signals SI4, SM4 and SS4 respectively, to place the C4 flip-flop 120 into a set state of operation in accordance with a predetermined condition. The signal on the upper output lead of the C3 flip-flop 110 will be termed the C3 signal and is fed to AND gate 106, and the signal appearing on the upper output lead of the C4 flip-flop 120 will be termed the C4 signal and is fed to AND gate 107. The remaining AND gates 104 and 105 shown receive the C1 and C2 signals respectively from the C1 flip-flop 78 and the C2 flip-flop 86. With each of the flip-flops C1, C2, C3 and C4 in a reset state of operation, a pattern of operation signals is provided whereby none of the AND gates 104, 105, 106 or 107 will be enabled and consequently no combination of $x$ and $y$ operand signals will be operative to provide an output signal. Conversely, with each of these latter flip-flops in a set state of operation, a pattern of operation signals is provided whereby OR gate 55 will receive an output signal from at least one of the AND gates 104 to 107 since each is enabled and at least one will receive a combination of input signals all having a 1 value. Intermediate of these two latter conditions, the flip-flops C1 to C4 may provide other patterns of operation signals. An output signal will be provided by OR gate 55 only upon certain predetermined combinations of operand signals. This operation is summarized in Table III wherein the first two columns represent the possible combinations of the $x$ and $y$ operand signals, and the next 16 columns represent the output signals from OR gate 55 in response to the combination of operand signals shown with each column representing a particular combination of the conditions of the four flip-flops C1 to C4.

TABLE III

| $x$ | $y$ | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|---|
| | | C1 $\overline{C2}$ $\overline{C3}$ C4 | C1 C2 $\overline{C3}$ $\overline{C4}$ | $\overline{C1}$ C2 $\overline{C3}$ C4 | C1 C2 C3 $\overline{C4}$ | $\overline{C1}$ $\overline{C2}$ C3 $\overline{C4}$ | C1 $\overline{C2}$ C3 $\overline{C4}$ | $\overline{C1}$ C2 C3 $\overline{C4}$ | C1 C2 C3 $\overline{C4}$ | $\overline{C1}$ $\overline{C2}$ C3 C4 | C1 $\overline{C2}$ $\overline{C3}$ C4 | $\overline{C1}$ C2 $\overline{C3}$ C4 | C1 C2 $\overline{C3}$ C4 | $\overline{C1}$ $\overline{C2}$ C3 C4 | C1 $\overline{C2}$ C3 C4 | $\overline{C1}$ C2 C3 C4 | C1 C2 C3 C4 |
| 0 | 0 | 0 | 1 | 0 | 1 | 0 | 1 | 0 | 1 | 0 | 1 | 0 | 1 | 0 | 1 | 0 | 1 |
| 0 | 1 | 0 | 0 | 1 | 1 | 0 | 0 | 1 | 1 | 0 | 0 | 1 | 1 | 0 | 0 | 1 | 1 |
| 1 | 0 | 0 | 0 | 0 | 0 | 1 | 1 | 1 | 1 | 0 | 0 | 0 | 0 | 1 | 1 | 1 | 1 |
| 1 | 1 | 0 | 0 | 0 | 0 | 0 | 0 | 0 | 0 | 1 | 1 | 1 | 1 | 1 | 1 | 1 | 1 |

By way of example, column 1 is representative of the condition wherein the flip-flops C1 to C4 are in a reset state of operation and therefore the $\overline{C1}$, $\overline{C2}$, $\overline{C3}$ and $\overline{C4}$ signals are all 1's and as such, no combination of $x$ and $y$ operand signals will provide an output signal. Column 7 represents the condition wherein the C1 flip-flop is reset, the C2 and C3 flip-flops are set, and the C4 flip-flop is reset. In such case the $\overline{C1}$, C2, C3 and $\overline{C4}$ signals are all 1's. If the $x$ and $y$ operands are both 0's and 1's no output signal will be provided by OR gate 55. Conversely, if the $x$ operand signal or the $y$ operand signal is a 1, column 7 indicates that an output signal will be provided; an operation identical to an exclusive OR.

FIGURE 6 illustrates one example of circuitry for obtaining various output signals as a function of both predetermined combinations of input signals and predetermined patterns of operation signals provided. Other flip-flops and gates may be added to obtain various other possible combinations of operation signals.

Although the present invention has been described with a certain degree of particularity, it should be understood that the present disclosure has been made by way of example.

The present invention has been described with respect to one illustrative environment; it is apparent that the invention is equally applicable in systems wherein simultaneous operations are desirable, such as a plurality of computers under control of a master computer, or control. Although the preceding illustrative embodiments of the invention have been implemented with AND gates, OR gates and flip-flops, it is obvious to those skilled in the art that other types of gating circuitry may be utilized as well as other types of bistable devices or signal providing means. Other modifications and variations of the present invention are made possible in the light of the above teachings.

I claim as my invention:

1. In a computer system including a plurality of processing elements all being under control of a central control means which provides control signals to all of the processing elements, a computation unit for each said processing element comprising:

a logic network having a plurality of sections each for carrying out at least a specific operation;

operation control means associated with an individual processing element and responsive to predetermined input signals for providing a plurality of operation signals on output lead means, the pattern of operation signals provided, representing specific operations to be performed;

said logic network being connected to said central control means and including a plurality of inputs for receiving control signals indicative of more than one operation to be performed and being additionally connected to said output lead means for receiving said operation signals for performing only the operation as represented by said pattern of operation signals when said central control means designates more than one operation.

2. In a parallel network type computer system including a plurality of processing elements all being under control of a central control means which provides control signals to all of the processing elements, a computation unit for each said processing element comprising:

a logic network having a plurality of sections for performing various operations in response to specific commands from the central control means;

said logic network including first input means for receiving first control signals from the central control means, indicative of one operation to be performed;

said logic network including at least second input means for receiving, concurrently with said first control signals, second control signals from the central control means; indicative of another operation to be performed;

operation control means associated with individual processing elements and having a plurality of bistable devices each said device including input means responsive to at least one of an instruction from the central control means or a condition within its associated processing element, for placing the bistable device into a set or reset condition;

the patterns of the conditions of said bistable devices representing various operations to be performed;

said logic network being responsive to the bistable devices of said operation control means for performing only those operations as represented by the pattern of the conditions of said bistable devices.

3. A computation unit for a computer system including a central control means comprising:

logic means for performing different operations in response to various commands from the central control means;

operation control means for providing a plurality of operation signals corresponding to different operations to be performed by said logic means;

said operation control means including a plurality of bistable devices each having first input means for being placed into a reset condition and second input means for being placed into a set condition;

said second input means including a plurality of gates, each said gate responsive to a unique enabling signal from the central control means and a signal indicative of a predetermined condition to provide a signal to set its associated bistable device;

the output signals of said bistable devices constituting said operation signals;

said logic means being operable to carry out said different operations only when said operation signals and said command from said central control means are indicative of the same operation to be performed.

4. A computation unit comprising:

logic means for performing different operations;

operation control means including input means;

said input means including a plurality of gates each for receiving a unique first input enabling signal and a predetermined second input signal;

the second input signal of at least a first of said gates emanating from the output of said logic means;

said operation control means being responsive to first and second input signals at specific ones of said gates for providing a specific pattern of operation signals with said logic means being responsive to said pattern of operation signals to carry out said different operations.

5. A computation unit for receiving operand signals from a memory means comprising:

logic means for performing different operations;

operation control means including input means;

said input means including a plurality of gates each for receiving a unique first input enabling signal and a predetermined second input signal;

the second input signal of one of said gates emanating from said memory means;

the second input signal of another of said gates emanating from said central control means;

said operation control means being responsive to first and second input signals at specific ones of said gates for providing a specific pattern of operation signals with said logic means being responsive to said pattern of operation signals to carry out said different operations.

6. A computation unit for a processing element of a parallel network type computer system having a plurality of processing elements each capable of storing information in the form of operand signals in an associated memory and all being under simultaneous control of a central control means, comprising:

sum and carry logic means responsive to predetermined combinations of output signals from said carry logic means and said operand signals for providing an output signal;

a first section of said sum logic means having means for implementing an addition operation;

a second section of said sum logic means having means for implementing a subtraction operation;

operation control means having a first and second output lead means connected to said carry logic means with said first and second output lead being additionally connected to said first and second section respectively;

the operation control means in each of the processing elements having input means responsive to one of several conditions including an instruction from the central control means, an information bit in its associated memory and an output signal from said sum and carry logic means, for providing an enabling operation signal on one of said first or second output lead means;

an enabling signal on said first output lead means enabling said carry logic means and said first section to carry out said addition operations;

an enabling signal on said second output lead means enabling said carry logic means and said second section to carry out said subtraction operations.

7. A computation unit for a processing element of a parallel network type computer system having a plurality of processing elements each capable of storing information in the form of operands and all under simultaneous control of a central control means, comprising:

sum and carry logic means;

a bistable device having input means for placing said device into a selected one of a set or reset state of operation;

said sum logic means including a first and second plurality of gates to which are applied various combinations of at least output signals from said carry logic means, and operand signals indicative of a first and second operand;

said first plurality of gates being additionally responsive to said bistable device in a set condition to be enabled thereby; and said second plurality of gates being additionally responsive to said bistable device in a reset condition to be enabled thereby.

8. In a parallel type computer system including a plurality of processing elements each including means for storing information in the form of operand signals on which desired operations are to be performed and all being under control of a central control means which provides identical control signals to all of the processing elements, a logic and arithmetic unit for each said processing element comprising:

sum and carry logic means for carrying out arithmetic and logical operations designated by a sequence of control signals from said central control means;

said logic means including a plurality of gates each having a plurality of inputs;

one of said inputs of each gate operatively connected to receive control signals from said central control means;

others of said inputs operatively connected to receive various combinations of operand signals indicative of a first and second of said operand signals;

operation control means having a plurality of output lead means and operative in response to applied input signals to provide operation signals on said output lead means;

different ones of said output lead means being connected to the inputs of different ones of said gates to selectively enable said gates.

References Cited

UNITED STATES PATENTS

| | | | |
|---|---|---|---|
| 2,997,704 | 8/1961 | Gordon et al. | 340—347 |
| 3,219,980 | 11/1965 | Griffith et al. | 340—172.5 |
| 3,229,260 | 1/1966 | Falkoff | 340—172.5 |
| 3,238,506 | 3/1966 | Jung et al. | 340—172.5 |
| 3,023,962 | 3/1962 | Stafford | 235—175 |
| 3,100,837 | 8/1963 | Gesek | 235—175 |
| 3,125,676 | 3/1964 | Jeeves | 235—175 |
| 3,234,370 | 2/1966 | Erickson | 235—175 X |
| 3,287,702 | 11/1966 | Borck et al. | 340—172.5 |
| 3,287,703 | 11/1966 | Slotnick | 340—172.5 |

OTHER REFERENCES

Richards, Arithmetic Operations in Digital Computers, Van Nostrand, 1955, pp. 121 to 124.

PAUL J. HENON, *Acting Primary Examiner.*

ROBERT C. BAILEY, *Examiner.*

P. L. BERGER, *Assistant Examiner.*